United States Patent
Matsui

(10) Patent No.: US 7,523,311 B1
(45) Date of Patent: Apr. 21, 2009

(54) METHOD FOR EMBEDDING ELECTRONIC WATERMARK, DECODING METHOD, AND DEVICES FOR THE SAME

(75) Inventor: Kineo Matsui, Yokosuka (JP)

(73) Assignee: Kowa Co., Ltd., Aichi-Ken (JP)

( * ) Notice: Subject to any disclaimer, the term of this patent is extended or adjusted under 35 U.S.C. 154(b) by 0 days.

(21) Appl. No.: 09/889,913

(22) PCT Filed: Jan. 24, 2000

(86) PCT No.: PCT/JP00/00334

§ 371 (c)(1),
(2), (4) Date: Dec. 13, 2001

(87) PCT Pub. No.: WO00/44163

PCT Pub. Date: Jul. 27, 2000

(30) Foreign Application Priority Data

Jan. 25, 1999 (JP) ................... 11-015674

(51) Int. Cl.
*G06K 9/64* (2006.01)
*G06K 9/52* (2006.01)
*H04L 9/00* (2006.01)

(52) U.S. Cl. .................. 713/176; 382/276; 382/278

(58) Field of Classification Search ........... 713/176, 713/168; 382/276, 278
See application file for complete search history.

(56) References Cited

U.S. PATENT DOCUMENTS

| 5,809,160 | A |   | 9/1998  | Nitzberg et al.           |
|-----------|---|---|---------|---------------------------|
| 5,822,432 | A |   | 10/1998 | Moskowitz et al.          |
| 5,825,892 | A | * | 10/1998 | Braudaway et al. ... 380/51 |
| 5,915,027 | A | * | 6/1999  | Cox et al. ........... 380/54 |
| 5,960,081 | A | * | 9/1999  | Vynne et al. .......... 713/176 |
| 6,037,984 | A | * | 3/2000  | Isnardi et al. ........ 375/240.21 |
| 6,064,764 | A | * | 5/2000  | Bhaskaran et al. ..... 382/183 |
| 6,104,826 | A | * | 8/2000  | Nakagawa et al. ..... 382/100 |
| 6,122,403 | A | * | 9/2000  | Rhoads ............... 382/233 |
| 6,154,571 | A | * | 11/2000 | Cox et al. ............ 382/250 |
| 6,192,138 | B1 | * | 2/2001 | Yamadaji ............. 382/100 |

(Continued)

FOREIGN PATENT DOCUMENTS

EP          0840513         5/1998

(Continued)

OTHER PUBLICATIONS

Ohbuchi et al. "Watermarking Three-dimensional Polygonal Models", ACM Multimedia 97, 1997 pp. 261-272.*

(Continued)

*Primary Examiner*—Christopher A Revak
*Assistant Examiner*—Matthew T Henning
(74) *Attorney, Agent, or Firm*—Beyer Law Group LLP

(57) ABSTRACT

The method extracts a plurality of blocks from a master image, processes image data corresponding to each block by orthogonal transform, compares coefficients of adjoining blocks with each other, and modifies the order of magnitude of the coefficients, based on bit information to be embedded. The bit information to be embedded is constructed as a basic pattern, which is generated, for example, by the density pattern method. The basic pattern is embedded in image data iteratively. The process of iteratively embedding the basic pattern enhances the resistance against various attacks.

16 Claims, 12 Drawing Sheets

U.S. PATENT DOCUMENTS

| | | | |
|---|---|---|---|
| 6,285,775 B1 * | 9/2001 | Wu et al. | 382/100 |
| 6,415,042 B1 * | 7/2002 | Shin | 382/100 |
| 6,463,162 B1 * | 10/2002 | Vora | 382/100 |
| 6,477,276 B1 * | 11/2002 | Inoue et al. | 382/232 |
| 6,532,541 B1 * | 3/2003 | Chang et al. | 713/176 |
| 6,728,409 B2 * | 4/2004 | Inoue et al. | 382/232 |
| 7,154,560 B1 * | 12/2006 | Chang et al. | 348/598 |
| 7,269,734 B1 * | 9/2007 | Johnson et al. | 713/176 |

FOREIGN PATENT DOCUMENTS

| | | |
|---|---|---|
| JP | 10-234012 | 2/1998 |
| WO | 97-43235 | 12/1997 |

OTHER PUBLICATIONS

Ohnishi et al. "Embedding a Seal into a Picture Under Orthogonal Wavelet Transform", IEEE Proceedings of Multimedia '96, 1996, pp. 514-521.*

Natarajan, Balas "Robust Public Key Watermarking of Digital Images", Hewlett-Packard Company 1997.*

Johnson et al. "Exploring Steganography: Seeing the Unseen", Computer, vol. 31, No. 2, pp. 26-34, Feb. 1998.*

G. K. Wallace, \The JPEG still picture compression standard, IEEE Transactions on Consumer Electronics, vol. 38, No. 1, pp. xviii{xxxiv, Feb. 1992.*

Choi et al., "Digital Watermarking Using Inter-block Correlation," Image Processing, International Conference on Kobe, 1999, 216-220.

* cited by examiner

Fig.4

| s(0) | s(1) | s(2) | s(3) |
|---|---|---|---|
| s(4) | s(5) | s(6) | s(7) |
| s(8) | s(9) | s(10) | s(11) |
| s(12) | s(13) | s(14) | s(15) |

Fig.5

| m | 16πm | bm |
|---|---|---|
| 1 | 16 | 4 |
| 2 | 120 | 6 |
| 3 | 560 | 9 |
| 4 | 1820 | 10 |
| 5 | 4368 | 12 |
| 6 | 8008 | 12 |
| 7 | 11440 | 13 |
| 8 | 12870 | 13 |
| 9 | 11440 | 13 |
| 10 | 8008 | 12 |
| 11 | 4368 | 12 |
| 12 | 1820 | 10 |
| 13 | 560 | 9 |
| 14 | 120 | 6 |
| 15 | 16 | 4 |
| 16 | 1 | 0 |

Fig.8

| DIGITAL WATERMARK / DIFFERENCE | | S | | | | OUTPUT LOGIC FUNCTION |
|---|---|---|---|---|---|---|
| | | 0 | | 1 | | |
| D | 0 | 1 | 0 | 1 | 0 | E1 |
| | 1 | 0 | 1 | 0 | 1 | E2 |
| KEY | | 0 | 1 | | 0 | |
| | | K | | | | |

Fig.11

| KEY / DIFFERENCE | | K | |
|---|---|---|---|
| | | 0 | 1 |
| D | 0 | 1 | 0 |
| | 1 | 0 | 1 | ially desir-
METHOD FOR EMBEDDING ELECTRONIC WATERMARK, DECODING METHOD, AND DEVICES FOR THE SAME

TECHNICAL FIELD

The present invention relates to a method of embedding a digital watermark in two-dimensional data, such as image data, a method of decoding the embedded digital watermark, and an apparatus that actualizes these methods.

BACKGROUND ART

The advanced computer network like the Internet accelerates digitalization of information and allows a large number of users to readily access required information. Such advanced environment, on the other hand, causes digital contents including digital information with the copyright to be readily duplicated as unauthorized copies without permission of copyright holders. Infringement of the copyright due to the illegal copies is becoming a significant problem. With a view to preventing the infringement of the copyright with regard to color images, which are the main part of digital information in the digital contents, the digital watermarking technique draws the vigorous attention. The digital watermarking technique embeds the copyright information in data of a master color image in a secret and unnoticeable manner to any third person and extracts the copyright information from the embedded master color image according to the requirements.

One known technique of embedding a digital watermark in two-dimensional data like image data causes the image data to be subjected to orthogonal transform, such as discrete cosine transform, and changes the resulting coefficients based on a predetermined algorithm. In this technique, the master image is closed to the public. The procedure processes both the master image and a potential illegal copied image by the orthogonal transform and compares their coefficients for identification of the copied image.

This prior art technique requires the master image, which is closed to the public, for extraction of the copyright information and causes another significant issue, management of the master image. The increase in number of master images makes the management more difficult. It is accordingly desirable to embed a digital watermark in a specific form that allows direct extraction from the image.

The digital watermark is also required to have sufficient resistance against the partial clipping of images and overwriting attacks. There are a diversity of attacks like Laplacian attacks against the digital watermarking that utilizes the orthogonal transform. No practically effective techniques have been proposed so far to solve the problems like the attacks and the partial clipping of images.

DISCLOSURE OF THE INVENTION

The object of the present invention is to solve the problems arising in the prior art technique of embedding and decoding the digital watermark utilizing the orthogonal transform discussed above, and thus to provide a technique of embedding and decoding the digital watermark that ensures good preservation and high resistance against a diversity of attacks.

At least part of the above and the other related objects is attained by a method of embedding a digital watermark in a master image. The method includes the steps of: extracting blocks of a predetermined size from the master image; processing image data corresponding to each block by orthogonal transform; comparing orthogonal transformed coefficients of at least two blocks having a predetermined relationship with each other and making the coefficients satisfy a preset order of magnitude according to bit information specified as the digital watermark, so as to embed the bit information; and processing each block with the embedded bit information by inverse orthogonal transform, so as to output a resulting image with the digital watermark embedded therein.

The method of embedding the digital watermark according to the present invention uses the at least two blocks having a predetermined relationship. The method compares the coefficients of the at least two blocks obtained by orthogonal transform and embeds bit information according to a preset order of magnitude of the coefficients. Only the person who knows both the predetermined relationship between the at least two blocks and the preset order of magnitude of the coefficients can extract the digital watermark from the image. Any third person who does not know the preset order of magnitude of the coefficients, on the other hand, can not decode the digital watermark. This arrangement thus actualizes the method of embedding the digital watermark, which is easily processed and has high resistance against various attacks. One possible application keeps a master image with the digital watermark embedded therein closed to the public and identifies the digital watermark by comparison with the master image.

The present invention is also directed to a method of decoding a digital watermark from a master image with the digital watermark embedded therein. The decoding method includes the steps of: extracting blocks of a predetermined size from the master image; processing image data corresponding to each block by orthogonal transform; and comparing orthogonal transformed coefficients of at least two blocks having a predetermined relationship with each other and extracting bit information, based on a preset order of magnitude that is applied to the coefficients.

The method of decoding the digital watermark according to the present invention enables the digital watermark to be readily extracted from the image.

Based on the above principle, the technique of the present invention may be actualized by a diversity of embodiments. For example, the at least two blocks having the predetermined relationship are blocks adjoining to each other. Adjoining images often hold a predetermined relationship. This may give a specific tendency to the order of magnitude of the coefficients with regard to the adjoining blocks. The adjoining blocks are thus suitable for the method of embedding the digital watermark according to the present invention.

Discrete cosine transform may be used for the orthogonal transform of the image data. The discrete cosine transform is adopted in JPEG and is favorably used for image compression. One preferable procedure quantizes the coefficients obtained by the orthogonal transform with a quantization table and uses the quantized coefficients to embed the bit information. The compression efficiency is freely adjustable by modifying the quantization table.

In accordance with one preferable embodiment, the image data is converted into a system of a luminance Y and color differences Cb and Cr, prior to the orthogonal transform. The luminance Y and the color differences Cb and Cr are subjected to the discrete cosine transform as the orthogonal transform. The bit information is embedded in coefficients obtained by the discrete cosine transform of the luminance Y.

In accordance with another preferable embodiment, embedding the bit information is carried out when the quantized coefficients of the at least two blocks are not all equal to zero. In the case where the coefficients of these blocks are all equal to zero, embedding the bit information to change the coefficients to a value other than zero may lower the efficiency of data compression.

In accordance with one preferable application, the method of embedding the digital watermark further includes the step of introducing a logic function that is true when a difference between the orthogonal transformed coefficients of the at least two blocks having the predetermined relationship is in a preset range. This advantageously simplifies the operation. In this case, the procedure adopted to embed the bit information is modified, based on the true and false state of the logic function. This facilitates change of the preset range.

In the above application, the method may further include the steps of: providing a secret key corresponding to each coefficient obtained by the orthogonal transform; and modifying the procedure adopted to embed the bit information, based on the secret key corresponding to each coefficient and the true and false state of the logic function with regard to the coefficient. This application makes it practically impossible to specify the rule adopted to embed the bit information without the secret key. The secret keys may be under management corresponding to respective images or respective copyright holders. Such arrangement facilitates management of the digital watermarking.

In accordance with another preferable application, the embedding method further includes the steps of:

providing a basic pattern, which is defined in a two-dimensional manner as a combination of binary information, as information of the digital watermark; specifying each piece of binary information included in the provided basic pattern as the bit information to be embedded; and embedding the binary information of the basic pattern by setting the at least two blocks having the predetermined relationship to one unit. In this application, the digital watermark is embedded as the basic pattern defined in the two-dimensional manner, and this basic pattern may directly be used as the copyright information. It is preferable that the basic pattern has redundancy. The redundancy of the pattern is utilized for detecting errors. The bit information of the basic pattern used for digital watermarking may be varied according to the characteristics of a master image, in which the digital watermark is to be embedded. A typical example of the basic pattern having redundancy is a density pattern. The density pattern is based on the principle that there are a plurality of different dot layouts having an identical density in the range of n×n pixels, and has high redundancy. The high redundancy of the density pattern is effectively used to detect errors.

When the number of elements constituting the basic pattern is sufficiently greater than the number of extracted blocks, the basic pattern may be embedded in the image data iteratively a predetermined number of times. This arrangement allows the basic pattern to be accurately decoded even when part of the image is clipped, thus enhancing the resistance of digital watermarking.

The method of embedding the digital watermark and the method of decoding the digital watermark may be attained in the form of storage media, in which programs of the corresponding methods are stored. Typical examples of the storage media include CD-ROMs, memory cards, and flexible disks. Such programs may be downloaded via a communication line. The method of embedding the digital watermark may be incorporated in a retouching software program for processing image data integrally or as a plug-in software program. The embedding method and the decoding method may alternatively be actualized by independent programs for embedding the digital watermark and decoding the digital watermark. The color images delivered as the digital contents often undergo compression by a diversity of compression techniques like JPEG. The programs of the corresponding methods may thus be incorporated in image data compression software integrally or as plug-in software programs. The programs may integrally be incorporated in a scanner that reads printed image data as digital data or scanning software. The programs may also be incorporated in a printer driver and a printer used to print digital data. The embedding method and the decoding method may also be actualized as apparatuses. In this case, these methods may be implemented by exclusive apparatuses, or the computer may read programs from the storage media to actualize a digital watermark embedding apparatus or a digital watermark decoding apparatus.

BRIEF DESCRIPTION OF THE DRAWINGS

FIG. 4 shows a watermark pattern to be embedded;

FIG. 5 shows various pieces of information expressible by the watermark pattern;

FIG. 8 is a table used to identify output logic functions E1 and E2, based on bit information s to be embedded, a logic variable D, and key information K;

FIG. 11 is a table used to identify an output logic function EE for decoding;

BEST MODES OF CARRYING OUT THE INVENTION

Principle of Embedding and Decoding Digital Watermark

Figure 1:
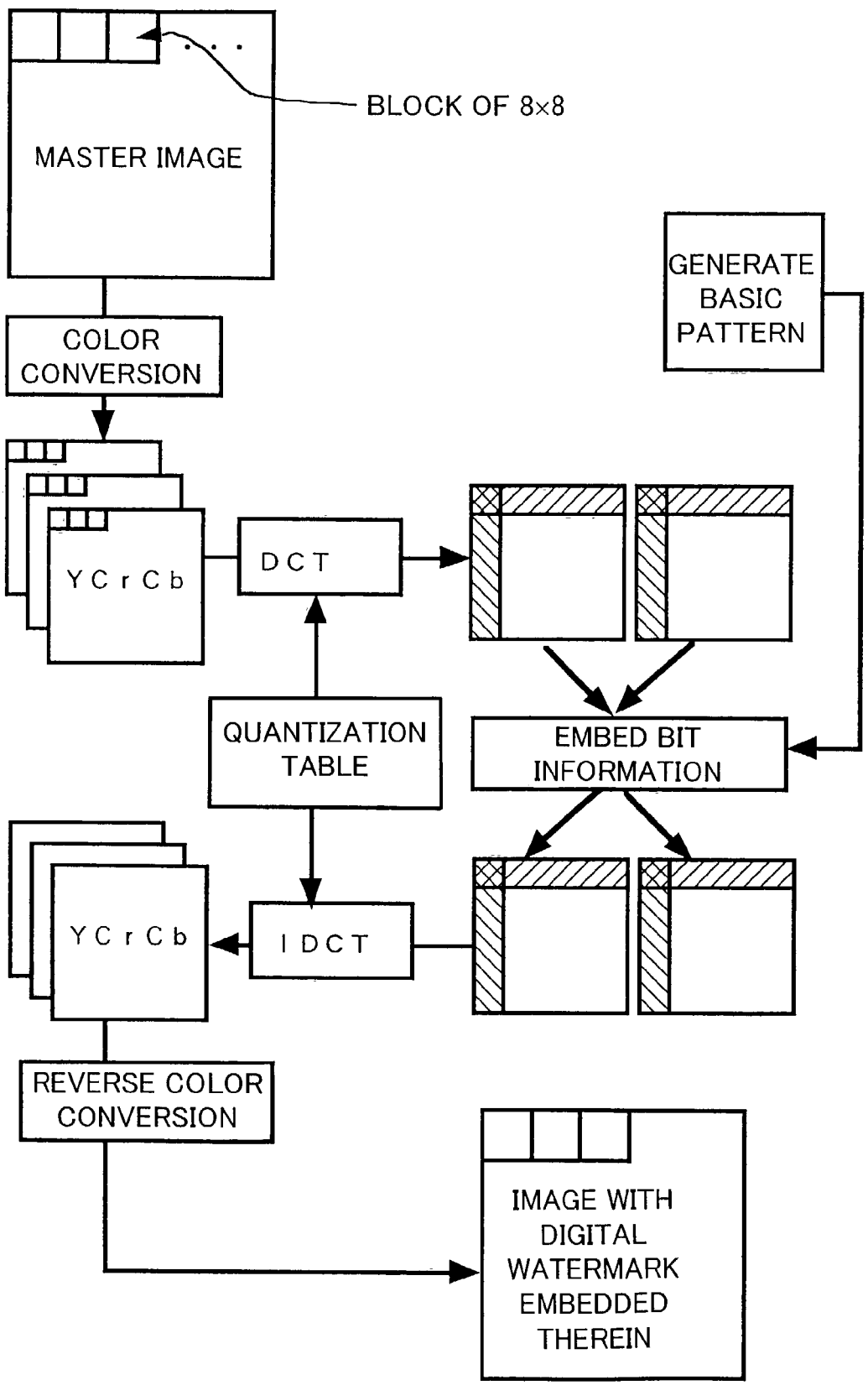
FIG. 1 illustrates the principle of a procedure of embedding and decoding a digital watermark in an embodiment of the present invention.

FIG. 1 illustrates a procedure of embedding a digital watermark in a digital image in an embodiment of the present invention and the principle of such processing. Image data of a master image are stored as digital information. As illustrated, the procedure extracts imaginary blocks of 8×8 pixels from the master image. This is the technique widely used for image compression like JPEG. Although the size of each block is 8×8 pixels in this embodiment, any other settings may be applicable for the size of the block.

The procedure subsequently causes the master image data to be subjected to color conversion. The process of color conversion may be omitted if not required. The color conversion, for example, converts RGB image data typically used on the computer into a YCrCb color difference signal system for the convenience of subsequent processing. The color conversion is carried out only for color images. When the master image is monochromatic, only luminance signals are the object of the processing, so that no color conversion is required. The subsequent processing may be performed without color conversion of the master image, when the efficiency of data processing is not much of importance.

In this embodiment, the color image is converted into the YCrCb signal system. The procedure carries out orthogonal transform of the Y plane representing a luminance signal. The procedure of this embodiment applies discrete cosine transform (hereinafter referred to as DCT) for the orthogonal transform, though another transform technique is also applicable. The DCT is carried out for each imaginary block of 8×8 pixels. Division of DCT coefficients (8×8) obtained by the DCT by coefficients provided in a quantization table (quantization levels) gives quantized DCT coefficients (8×8). The division based on the quantization table aims to compress data and is not essential, in principle, for embedding the digital watermark. The quantization table depends upon the roughness of the quantization. It is, however, not desirable that embedding the digital watermark significantly deteriorates the picture quality. A table giving little deterioration of the picture quality (that is, a table of a low compression ratio) may thus be applied favorably for the quantization table.

The above procedure carries out the DCT for each block of 8×8 pixels and obtains the quantized DCT coefficients. The procedure subsequently performs comparison between the DCT coefficients with regard to adjoining two blocks, so as to embed bit information. Because of the simplicity of the processing and the continuity in the master image, adjoining blocks are generally selected for the object of the comparison of the DCT coefficient. The object of the comparison is, however, not restricted to the adjoining blocks. The two blocks may be adjacent to each other in a vertical direction or in a horizontal direction. Another modification may utilize the DCT coefficients of three or more blocks to embed the bit information. The bit information embedded here is obtained from a basic pattern created in advance. The details of the method of creating the basic pattern, which is the source of the bit information, and the method of embedding the bit information will be discussed later.

The procedure then causes each block with the bit information embedded therein to be subjected to inverse discrete cosine transform (hereinafter referred to as IDCT). The IDCT uses the same quantization table as that used for the DCT. The inverse transform reconverts each block into image data of the original YCrCb color difference signal system. Application of the quantization table generally loses part of a high frequency component of the image data and thereby deteriorates the picture quality. The procedure subsequently carries out inverse color conversion to give a processed image of the original RGB system. This series of processing gives a processed image with the basic pattern embedded therein as the digital watermark.

In the above description, the processed image is reconverted to the original format (the RGB color system). The processed image may not be reconverted to the original format but may be stored in another format like JPEG. In this case, the procedure may embed a basic pattern, which corresponds to specific watermark information, in the image stored in the format of JPEG.

The procedure of decoding the watermark information embedded in the image data follows the above series of processing in the reverse direction. The procedure first specifies quantized DCT coefficients with regard to two blocks in the image data, identifies the relationship between the quantized DCT coefficients of the two blocks, and thereby extracts the bit information embedded in the two blocks. The procedure then rearranges the extracted bit information to restore the basic pattern. The details of this procedure will be discussed later.

<General Structure of Apparatus>

Figure 2:
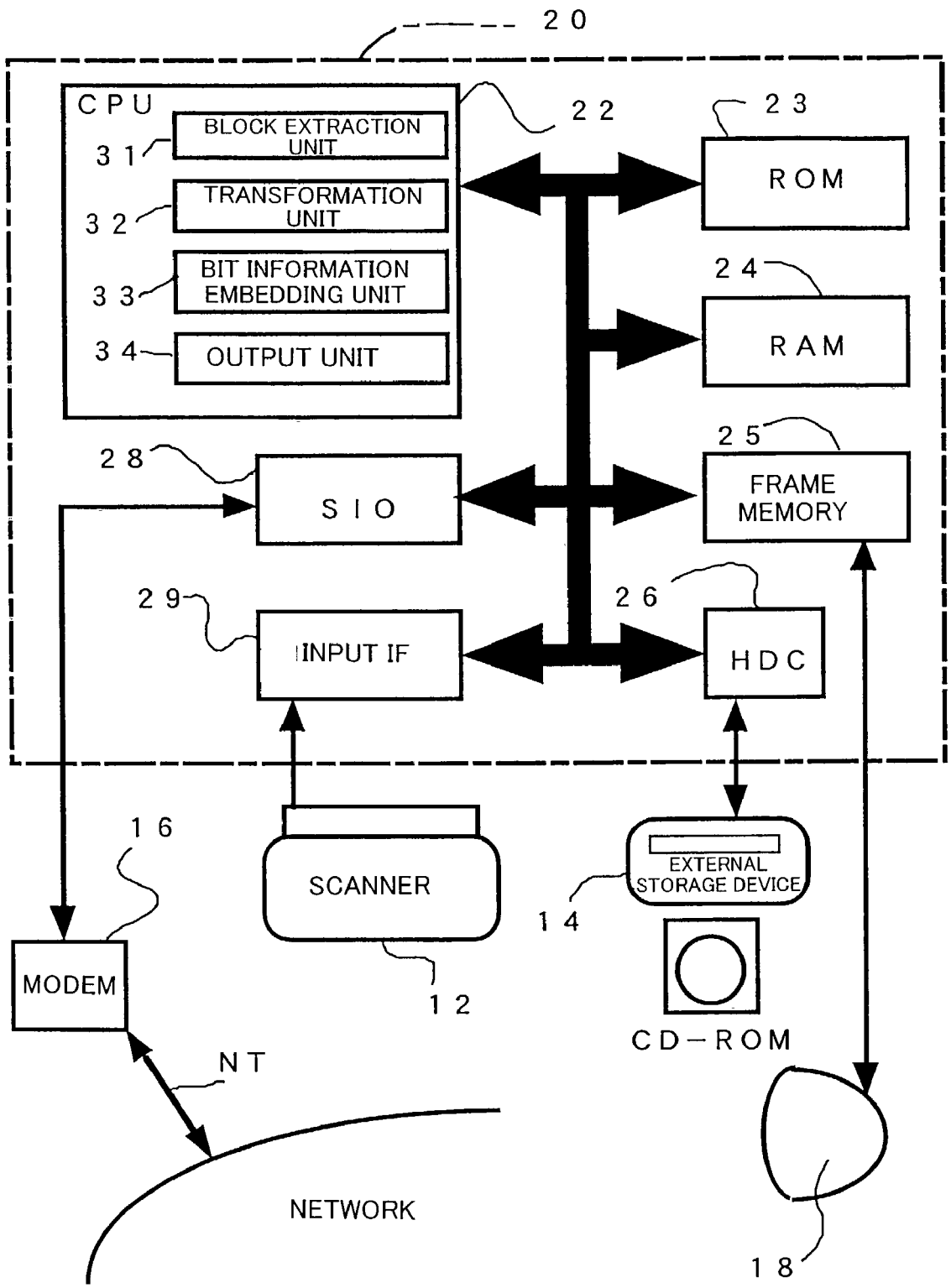
FIG. 2 is a block diagram illustrating the structure of a digital watermark embedding apparatus 10 of the embodiment.

The structure of an apparatus used in the embodiment is described briefly. FIG. 2 is a block diagram illustrating the hardware structure of a digital watermark embedding apparatus 10 that implements the method of embedding the digital watermark in the embodiment. As illustrated, the digital watermark embedding apparatus 10 includes a computer 20 and a scanner 12, an external storage device 14, such as CD-ROMs, a modem 16, and a display monitor 18 that are all connected to the computer 20. The computer 20 includes a CPU 22 that executes processing, a ROM 23 that stores a monitor program and other programs therein, and a RAM 24 onto which programs are loaded or in which data are temporarily registered in the course of operations. The computer 20 also includes a frame memory 25 that functions to display images on the monitor 18, a controller (HDC) 26 that is in charge of data transmission to and from the external storage device 14, a serial input-output circuit (SIO) 28 that is in charge of data transmission to and from the modem 16, and an input interface (input IF) 29 that functions to input images read by the scanner 12. A keyboard and a mouse are also connected to the computer 20, although they are omitted from the illustration. The modem 16 is connected to a computer network via a communication line NT. The computer 20 may download various image processing programs from a non-illustrated server on the computer network via the modem 16. The computer 20 may distribute image data with a digital watermark embedded therein through the computer network.

The CPU 22 executes the programs loaded onto the RAM 24 to actualize the functions of a block extraction unit 31, a transformation unit 32, a bit information embedding unit 33, and an output unit 34. These unit respectively correspond to the block extraction means, the transformation means, the bit information embedding means, and the output means of the present invention. The detailed functions of these units will be discussed later as a series of processing executed by the CPU 22.

Figure 3:
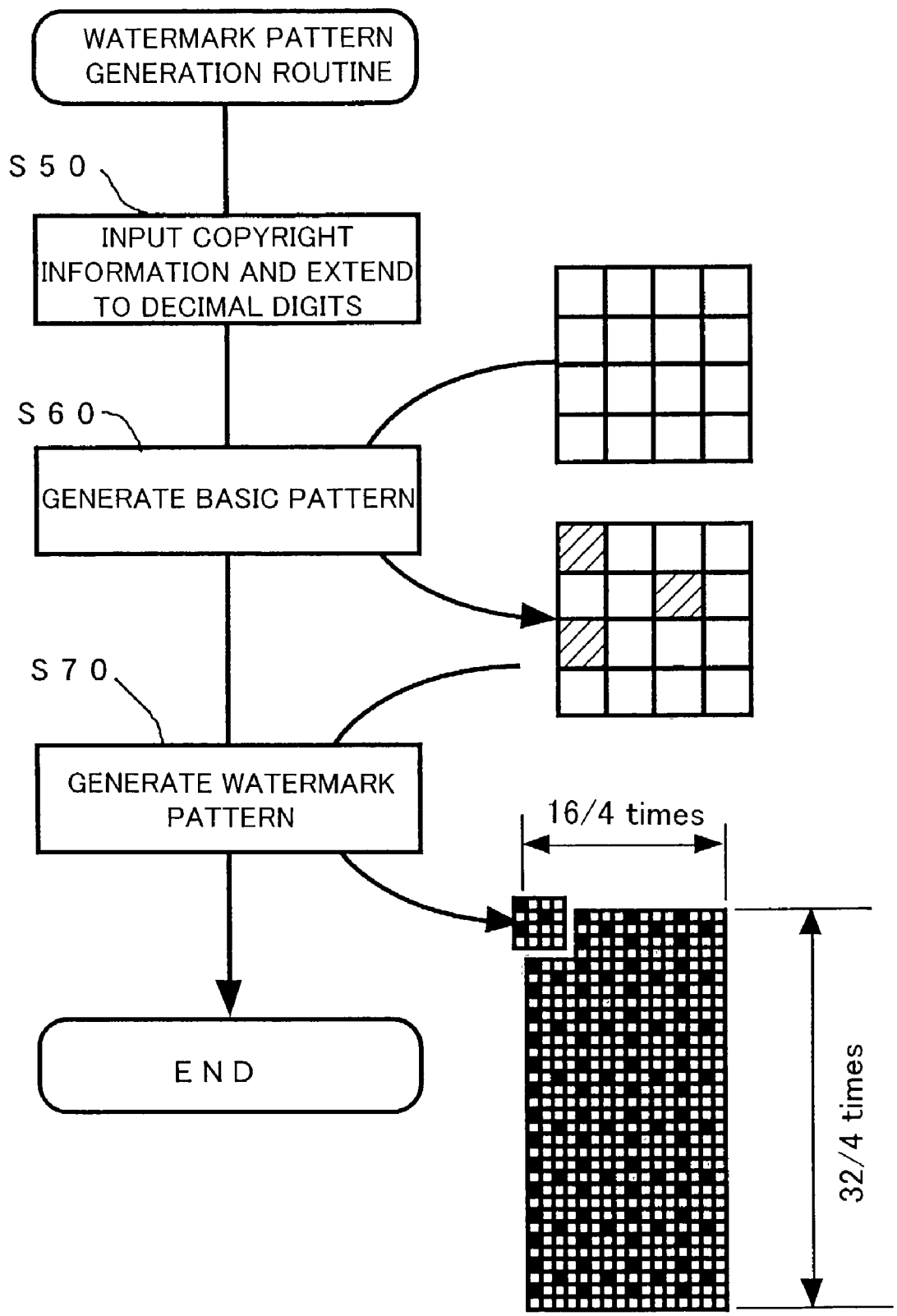
FIG. 3 is a flowchart showing a watermark pattern generation routine.

The following description regards the method of embedding the digital watermark. Before the digital watermark is embedded in the image data, the process generates a watermark pattern to be embedded. FIG. 3 is a flowchart showing a watermark pattern generation routine. When the program enters this routine, the CPU first inputs copyright information and extends the input copyright information to decimal digits (step S50). The copyright information is used to identify the copyright holder of a master image, which is the object of digital watermarking. In this embodiment, information corresponding to one code is assigned to each copyright holder. One code may alternatively be assigned to each work.

The process of extending decimal digits intrinsic to each copyright holder may automatically be carried out in the computer 20. Alternatively the copyright holder may manually specify a desired code. One preferable procedure transmits required information to a total management center, for example, a copyright management center, via the modem 16 in response to input of a copyright holder name into the computer 20 and receives the code intrinsic to the copyright holder or a work of the copyright holder from the total management center. This allows total management of copyright holder information.

The CPU then generates a basic pattern, based on the decimal digits (step S60). The technique of this embodiment does not simply embed a digital watermark as bit information but embeds the digital watermark in a specific pattern. The concrete procedure of this embodiment adopts the density pattern method (more specifically the method of Nakamura) to generate the basic pattern from the decimal digits. In the case where the watermark information is embedded in an image as a series of letter or numeral bits, no redundancy of the watermark information results in decoding errors when the image with the embedded watermark information is exposed to an attack. One possible measure against such troubles applies an error correction code to the digital watermark. The technique of this embodiment, however, utilizes the redundancy of the pattern.

The basic pattern is generated by the following method. The description first regards how much information can be mounted on a binary figure having a predetermined size n (in this example, 4×4, that is, n=4 as shown in FIG. 4). In the example of 4×4 shown in FIG. 4, the basic pattern consists of 16 watermark signals s(u) (u=0, 1, ..., 15). The signals s(u) are binary data taking either the value '0' or the value '1'. The number of s(u)=1 is expressed by m, which is introduced to map a binary pattern to the data using a redundancy code 'm-out-of-n2'. The value of each element s(u) is determined recursively by regarding each of the n2 elements on the watermark signal S to be embedded as a binary digit weighted by the number of combinations and using the relationship of:

$$n2 \Pi m = n2-1 \Pi m-1 + n2-1 \Pi m \quad (1)$$

Here the expression 'aΠb' represents the number of combinations in the case of extracting b elements out of a elements (the same definition is adopted in the following explanation).

When u=0, the first term on the right side of Equation (1) represents the total number of arrays satisfying s(0)←1, and the second term represents the total number of arrays satisfying s(0)←0. The arrays satisfying s(0)=1 are accordingly mapped to integers of:
{0, 1, 2, ..., m2−1Πm−1}, and the arrays satisfying s(0)=0 are mapped to integers of
{n2−1Πm−1, n2−1Πm−1+1, ..., m2Πm−1}.

According to this rule, the result of the comparison between copyright management information t (decimal digits) and n2−1Πm−1 is specified as:
when t≦n2−1Πm−1, s(u)←1; and
when t≧n2−1Πm−1, s(u)←0.

If s(0)=1, the procedure decrements the value m by one to lay out the residual (m−1) signals having the value '1' out of the signals s(u) other than s(0) (u=1, 2, ..., n2−1), and then compares t with n2−2Πm−1. If s(0)=0, on the contrary, the procedure subtracts n2−1Πm−1 from the value t to lay out the m signals having the value '1' out of the signals s(u) other than s(0) (u=1, 2, ..., n2−1, and then compares t with n2−2Πm−1. This operation is repeated until m=0. This series of processing determines all the positions of the value '1' in the basic pattern. The value '0' is accordingly set to the remaining s(u). This gives a watermark pattern S, which is one-to-one mapped to the given values m and t.

FIG. 5 shows a variety of basic patterns S expressible by the above procedure. When m is in a range of 7 to 9, one basic pattern is capable of expressing integers t in decimal notation corresponding to 13 bits. In the case where the basic pattern has high redundancy like the density pattern used in this embodiment, the high redundancy may be utilized to implement another series of processing, such as detection of errors. There are a plurality of density patterns having an identical density. In the density pattern having a fixed density, the setting for the layout of on (black) bits has a high degree of freedom. Under the condition of a fixed density, one possible application may restrict the number of on (black) pixels among all the pixels in each raster line (that is, the total number of pixels in the direction x) to even numbers. Another application may select an appropriate density pattern by taking into account the effects on the picture quality. The procedure of this embodiment uses the density pattern having the specific size to allow expression of decimal digits. Only one basic pattern is sufficient when the value t is in the expressible range of the redundancy system 'm-out-of-n2'. In the case where the copyright information, which is the object of management, exceeds this expressible range, the basic pattern may be modified to two or three different layouts, prior to embedding.

In this embodiment, the density pattern is capable of expressing decimal digits, so that the processing of step S60 shown in FIG. 3 selects and generates one of the basic patterns corresponding to the decimal digits obtained at step S50. The CPU repeats the selected basic pattern over the whole range of the image to generate the watermark pattern (step S70). The processing of this step is carried out as discussed below.

It is here assumed that a master image P, in which the watermark pattern is to be embedded, consists of 256 pixels× 256 pixels. There are 32×32 blocks Bu having the size of 8×8 pixels in the master image P. When each pair of adjoining blocks Bu and Bu+1 among all the blocks is specified as one set, there are 32×16 sets. Each bit of s(u) is mapped to each set, and the master image P accordingly has 8×4 spaces, each accepting the 4×4 basic pattern. When only one basic pattern is sufficient for expression of copyright management information, the watermark information S can be recorded iteratively by the total of 32 times, that is, four times in the horizontal direction and eight times in the vertical direction, in the master image P. The arrangement of recording the basic pattern iteratively to generate the watermark pattern enhances the redundancy of the watermark pattern and attains the sufficiently high resistance against Laplacian attacks on the image data with the digital watermark embedded therein and partial clipping of the image data. In the case where two or more basic patterns S are required to express a large capacity of copyright management information, the two or more basic patterns S are generated by varying the value m to be distinguishable from each other. Since there is a possibility that part of the image is clipped, it is preferable that the plurality of basic patterns S are laid out at random in the 8×4 spaces. This application enables not only the decimal digits but a letter or a series of letters to be embedded. In the case of a large image, the procedure may increase the number of repetitions of the basic pattern and embeds detailed letter information representing the copyright management information.

Figure 6:
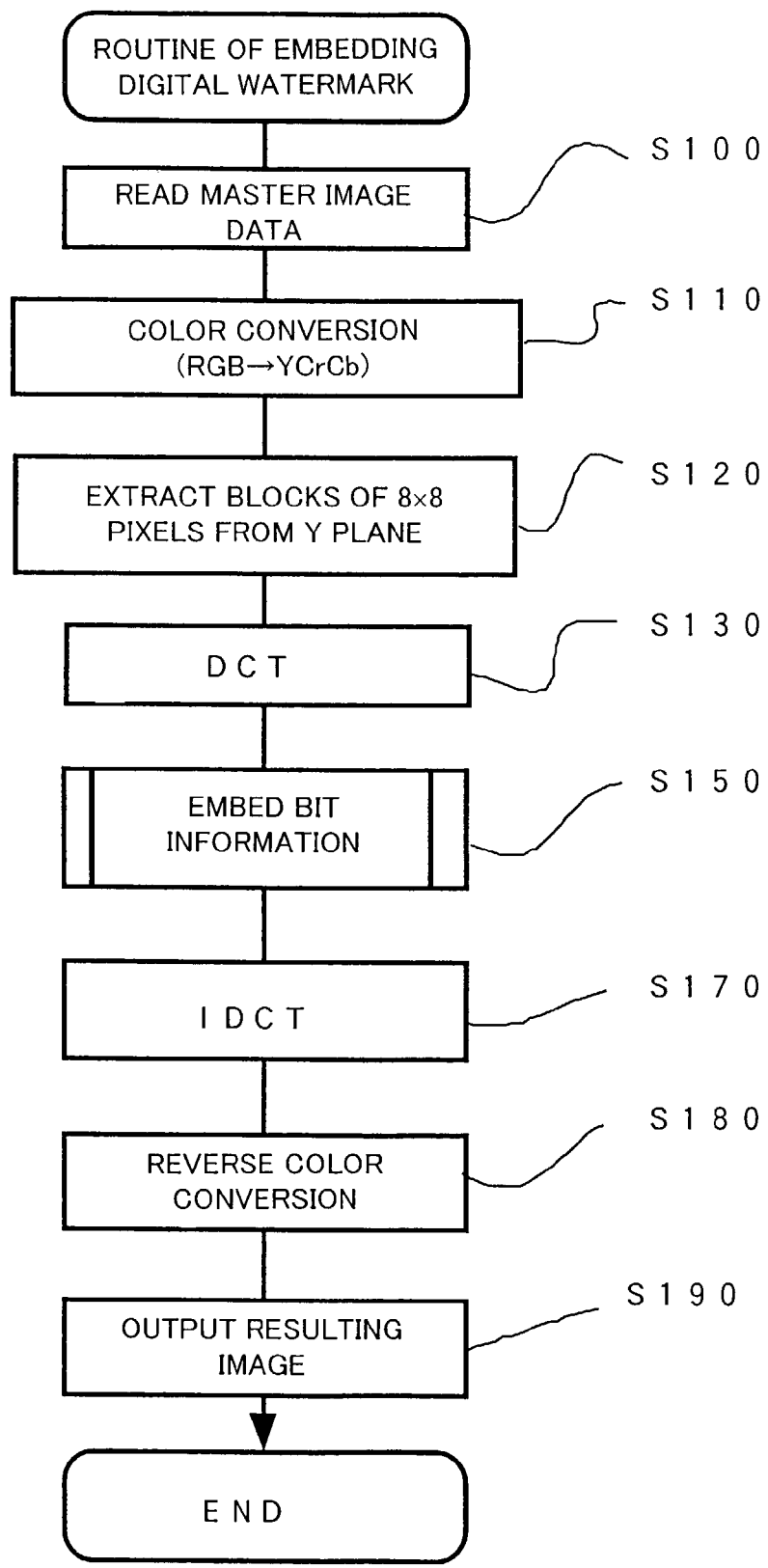
FIG. 6 is a flowchart showing the outline of a routine of embedding a digital watermark.

The above series of processing generates the watermark pattern. The following describes the details of the process of embedding the watermark pattern in image data. FIG. 6 is a flowchart showing the outline of a routine of embedding the digital watermark. When the program enters the routine, the CPU first reads master image data (step S100), and then carries out color conversion of the input master image data (step S110). As described previously, the color conversion converts the RGB signal system, which is typically used for the image processing on the computer 20, into the YCrCb color difference signal system. When the master image is expressed by color signals, the color conversion gives image data divided into three planes, that is, a luminance signal Y and color difference signals Cr and Cb.

The CPU subsequently extracts blocks of 8×8 pixels from the Y plane corresponding to the luminance signal (step S120). When the master image consists of 256×256 pixels, for example, the procedure sequentially extracts 32 blocks in the horizontal direction x from the upper left corner of the master image as the origin, shifts in the vertical direction y when reaching the end of the horizontal line, and again extracts 32 blocks on a next horizontal line. This series of operations is repeated 32 times to extract 32×32 blocks from the master image. Each extracted block in the Y plane is subjected to discrete cosine transform (DCT). The details of the DCT are known in the art and are thus not specifically described here. The procedure of this embodiment uses a quantization table for the luminance component of JPEG to quantize the DCT coefficients.

The CPU then embeds the bit information specified according to the preset watermark basic pattern in the DCT coefficients of each block (step S150). The details of this process will be discussed later with reference to FIG. 7. After embedding the bit information, the CPU carries out inverse discrete cosine transform (IDCT) of the 32×32 blocks (step S170), performs reverse color conversion to reconvert the image data into the original RGB system (step S180), and outputs the resulting image (step S190). The output may print the image with a color printer or distribute the image to the users on the network via the modem 16. Although the procedure of this embodiment reconverts the image with the embedded watermark pattern into the RGB system, the compressed image in the JPEG format may alternatively be output.

The details of the bit information embedding process (step S150) are discussed below. When the program enters the bit information embedding routine shown in FIG. 7, the CPU first inputs DCT coefficients $D_i(u,v)$ and $D_{i+1}(u,v)$ with regard to u-th and (u+1)-th blocks adjoining to each other in the Y plane (step S151). The CPU then divides and quantizes the input DCT coefficients with a quantization table, specifies a frequency coefficient domain F, and identifies elements $f_u(i,j)$ and $f_{u+1}(i,j)$ of the frequency coefficient domain F (step S152). Here i, j=0, 1, . . . , 7. The CPU then calculates an absolute value $d(i,j)$ of the difference between the coefficients at the identical address (i,j) (step S153).

The CPU subsequently specifies key information K (step S154). The key information K is used to keep the embedding rule closed to the public in the process of embedding the bit information discussed below, and is preset in secrecy as K={k (i,j)|i,j=0, 1, 2, . . . , 7}. In this embodiment k(i,j) takes either the value '0' or the value '1'.

The CPU extracts bit information s(u), which is to be embedded, from the watermark pattern S (step S155). In this embodiment, one piece of bit information is mapped to each pair of adjoining blocks. The setting based on the watermark pattern discussed previously (see FIG. 3) maps each piece of bit information to each set of adjoining blocks. The CPU then calculates a logic variable D (step S156). The setting of the logic variable D is specified according to the following condition. When $d(i,j)$ is not less than a value 'a', D is set equal to 1. When $d(i,j)$ is less than the value 'a', on the other hand, D is set equal to 0. The value 'a' represents the resistance of digital watermark. The greater value 'a' generally gives the higher resistance of the digital watermark against an external attack. The extremely large value 'a', however, adversely affects the picture quality.

The above series of processing identifies the logic variable D based on the absolute value of the difference between the quantized DCT coefficients, the key information K, and the bit information s(u) to be embedded, with regard to a set of adjoining blocks. The CPU subsequently calculates an output logic function E1 from these three pieces of information (step S161). The output logic function E1 is shown in a logic table of FIG. 8 and is defined by a logic expression of:

$$E1 = S\backslash \cdot D\backslash \cdot K\backslash + S \cdot D\backslash \cdot K$$

The symbol '\' shows that a preceding variable is negative logic.

The CPU determines whether or not the output logic function E1 is equal to 1 (step S162). When E1 is not equal to 1, the next step is skipped. When E1 is equal to 1, on the other hand, the CPU adds a preset value $e(i,j)$ to the greater one of the coefficients $f_u(i,j)$ and $f_{u+1}(i,j)$ at step S163. The preset value $e(i,j)$ is generally set equal to the value 'a' representing the resistance of the digital watermark.

The CPU subsequently calculates an output logic function E2 (step S165). This process is equivalent to identify the box E2 shown in FIG. 8, and the output logic function E2 is defined by a logic expression of:

$$E2 = S\backslash \cdot D \cdot K + S \cdot D \cdot K\backslash$$

The CPU then determines whether or not the output logic function E2 is equal to 1 (step S166), as in the case of the output logic function E1. When E2 is equal to 1, the CPU subtracts the preset value $e(i,j)$ from the greater one of the coefficients $f_u(i,j)$ and $f_{u+1}(i,j)$ at step S167. The CPU determines whether the above series of processing has been performed for all the blocks included in the master image (step S169), and repeats the above series of processing until the processing has been concluded for all the blocks. In the case of the master image consisting of 256×256 pixels, since each object of the processing is the set of two adjoining blocks, the above series of processing is repeated 32×16 times. In the course of the processing, the 4×4 basic pattern is thus iteratively embedded 4×8 times, as mentioned previously.

Figure 7:
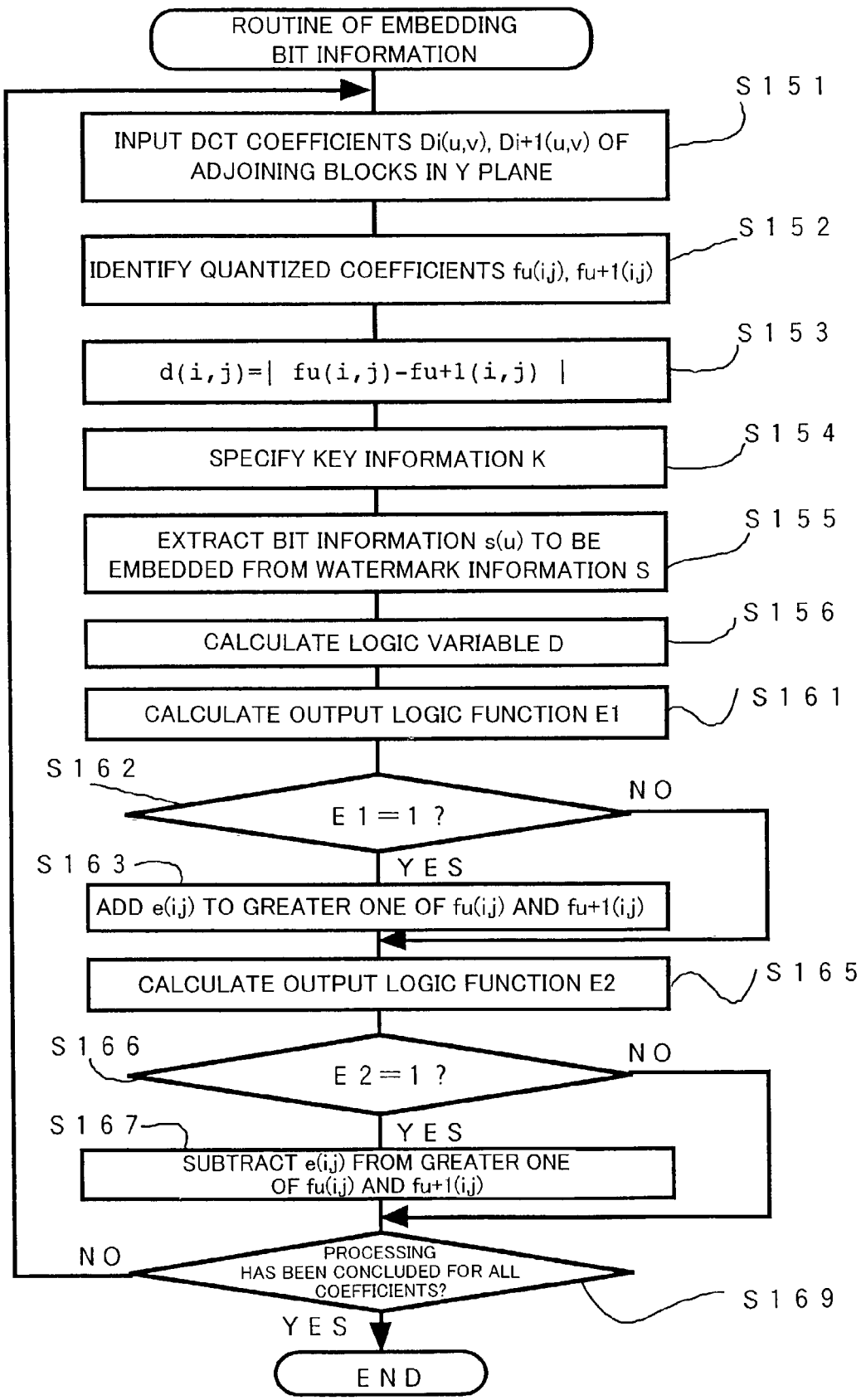
FIG. 7 is a flowchart showing a routine of embedding bit information.

As described above with reference to the principle diagram of FIG. 1, the outline of the watermark pattern embedding process shown in FIG. 6, and the details of the bit information embedding process shown in FIG. 7, the technique of this embodiment utilizes the quantized DCT (discrete cosine transform) coefficients of the two blocks having a predetermined relationship (the contiguity in the x direction in this embodiment). When there is a certain difference between these coefficients, the procedure embeds the bit information s(u) in the coefficients with referring to the key information K. Namely this method regards the one-bit watermark signal s(u) as the value of the difference between the pair of elements $f_u(i,j)$ and $f_{u+1}(i,j)$ in the frequency coefficient domain and embeds the watermark signal s(u) with the redundancy in the quantized coefficients with regard to each set of the two blocks. The watermark pattern is constructed as repetition of the basic pattern. This attains the dual structure of the watermark information and allows introduction of rich redundancy. The digital watermark accordingly has sufficiently high resistance against clipping and Laplacian attacks. The setting of the resistance may be specified readily by the preset value $e(i,j)$. The resistance against an attack is discussed later as an experiment. Since the pair of elements $f_u(i,j)$ and $f_{u+1}(i,j)$ in the frequency coefficient domain are varied, the image is affected by a minute variation in frequency component over the whole frequency range and slightly deteriorates its picture quality. When a high-quality output image is required, a small value should be set to the resistance parameter e(i,j)=a. Omission of the coefficients having i and j equal to 0, that is, the direct current component, and part of low frequency components from the target of embedding the bit information is also preferable to keep the high picture quality. In this application, while several elements having i,j=0 are omitted from the target of embedding the bit information, the bit information is still embedded in most of the blocks. The digital watermark can thus be restored with sufficient accuracy.

Although using the key information K is not essential, the procedure of this embodiment uses the key information K to make the embedding rule closed to the public. This makes it practically impossible for any third person who gains the image to illegally extract and destroy the embedded information.

Figure 9:
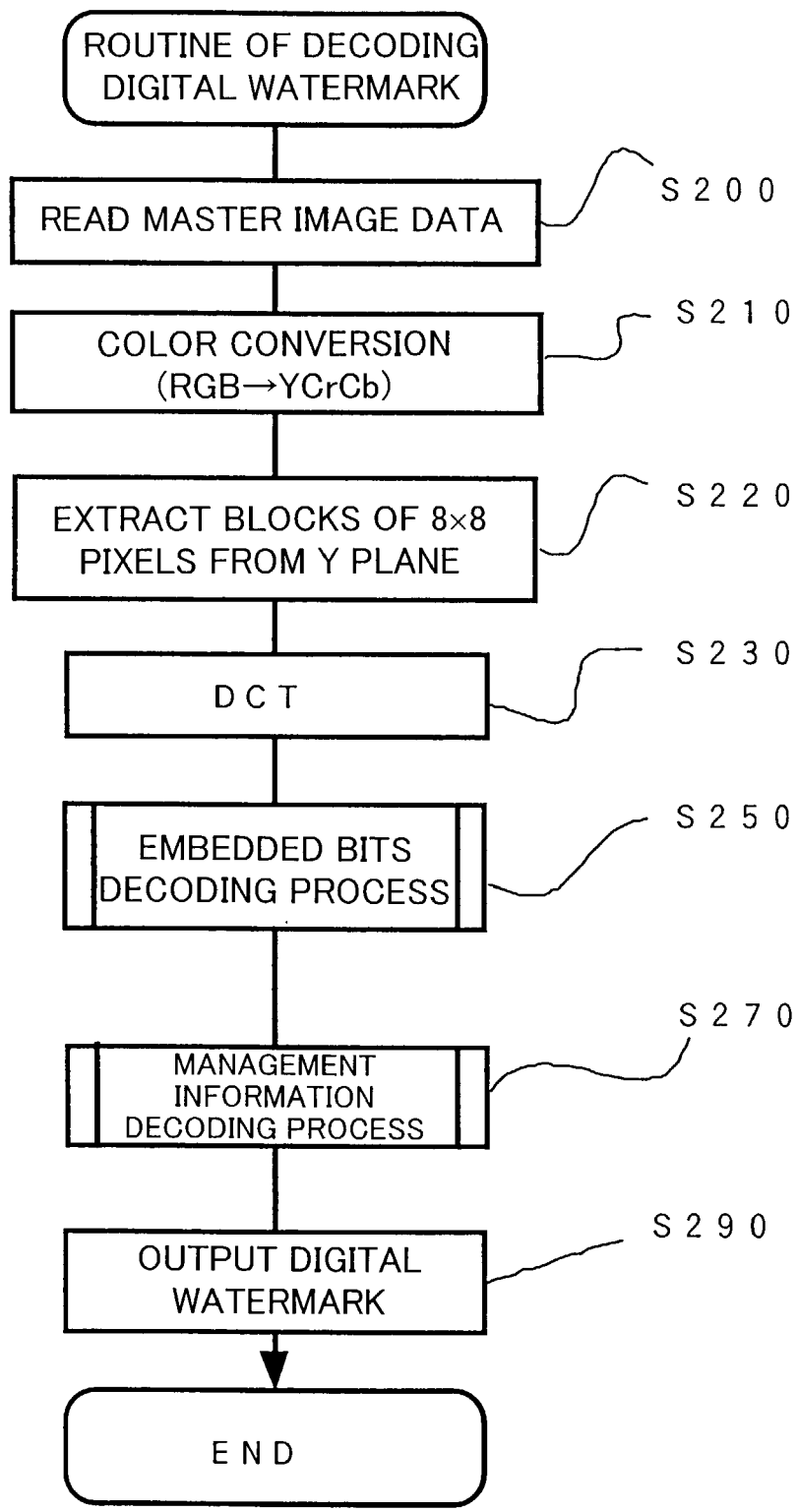
FIG. 9 is a flowchart showing a routine of decoding a digital watermark.
Figure 10:
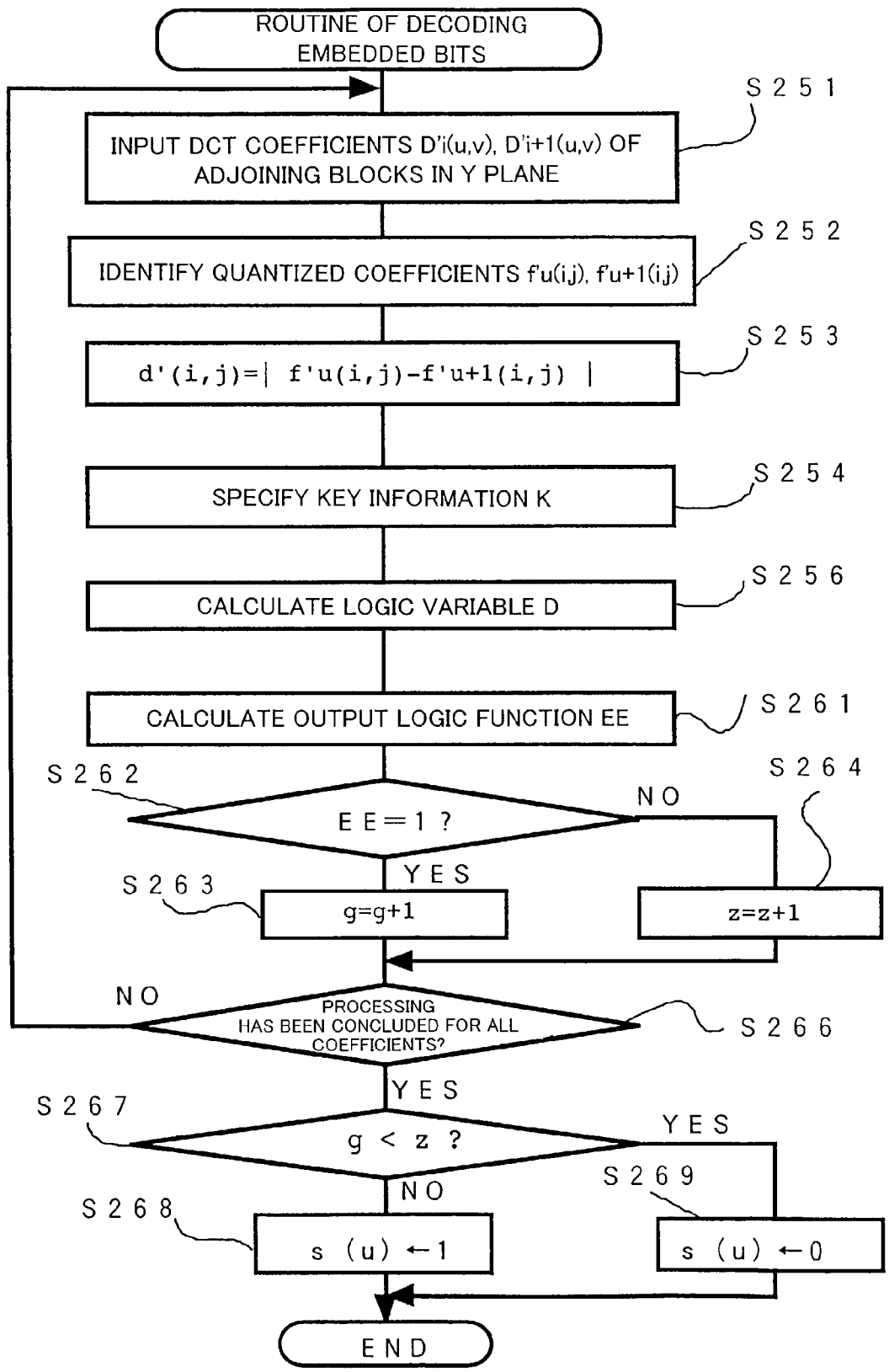
FIG. 10 is a flowchart showing a routine of decoding embedded bits.

The following describes a process of decoding a digital watermark embedded in an image. FIG. 9 is a flowchart showing a routine of decoding a digital watermark. FIG. 10 is a flowchart showing the details of the process of decoding embedded bits. These flowcharts correspond to the flowcharts of the digital watermark embedding process shown in FIGS. 6 and 7 and are explained briefly.

When the program enters the digital watermark decoding routine, the CPU first reads image data, which is the object of decoding the digital watermark (step S200), and carries out color conversion of the input image data (step S210). The CPU then extracts blocks of 8×8 pixels from the Y plane (step S220) and processes the extracted blocks by discrete cosine transform (DCT) (step S230). The CPU decodes embedded bits from the quantized DCT coefficients thus obtained (step S250) and restores a basic pattern of the digital watermark based on the decoded bit information (step S270). The CPU finally outputs a restored digital watermark (step S290).

As shown in FIG. 10, the process of decoding the embedded bits at step S250 first inputs DCT coefficients D'i (u,v) and D'i+1 (U,v) of adjoining blocks in the Y plane (step S251). The CPU divides and quantizes the DCT coefficients with a quantization table, specifies a frequency coefficient domain F', and identifies elements f'u(i,j) and f'u+1(i,j) of the frequency coefficient domain F' (step S252). The CPU subsequently calculates an absolute value d'(i,j) of the difference between the coefficients at the identical address (i,j) (step S253).

The CPU then specifies the key information K (step S254) and calculates a logic variable D from the absolute value d'(i,j) (step S256). The setting of the logic variable D is specified according to the following condition. When d'(i,j) is not less than the value 'a', D is set equal to 1. When d'(i,j) is less than the value 'a', D is set equal to 0.

The above series of processing identifies the logic variable D based on the absolute value of the difference between the quantized DCT coefficients and the key information K with regard to a set of two blocks. The CPU then calculates an output logic function EE from these two pieces of information (step S261). The output logic function EE is shown in a logic table of FIG. 11 and is defined by a logic expression of:

$$EE = D \cdot K + D \setminus \cdot K \setminus$$

The CPU determines whether or not the output logic function EE is equal to 1 (step S262). When EE is equal to 1, a variable g is incremented by one (step S263). When EE is not equal to 1, on the other hand, a variable z is incremented by one (step S264). The CPU determines whether the above series of processing has been performed for all the blocks included in the master image (step S266), and repeats the above series of processing until the processing has been concluded for all the blocks.

On completion of the above processing with regard to all the blocks, the CPU compares the variable g with the variable z and sets either the value '1' or the value '0' to the bit information s(u) embedded in the two blocks according to the majority rule (steps S268 and S269).

Figure 12:
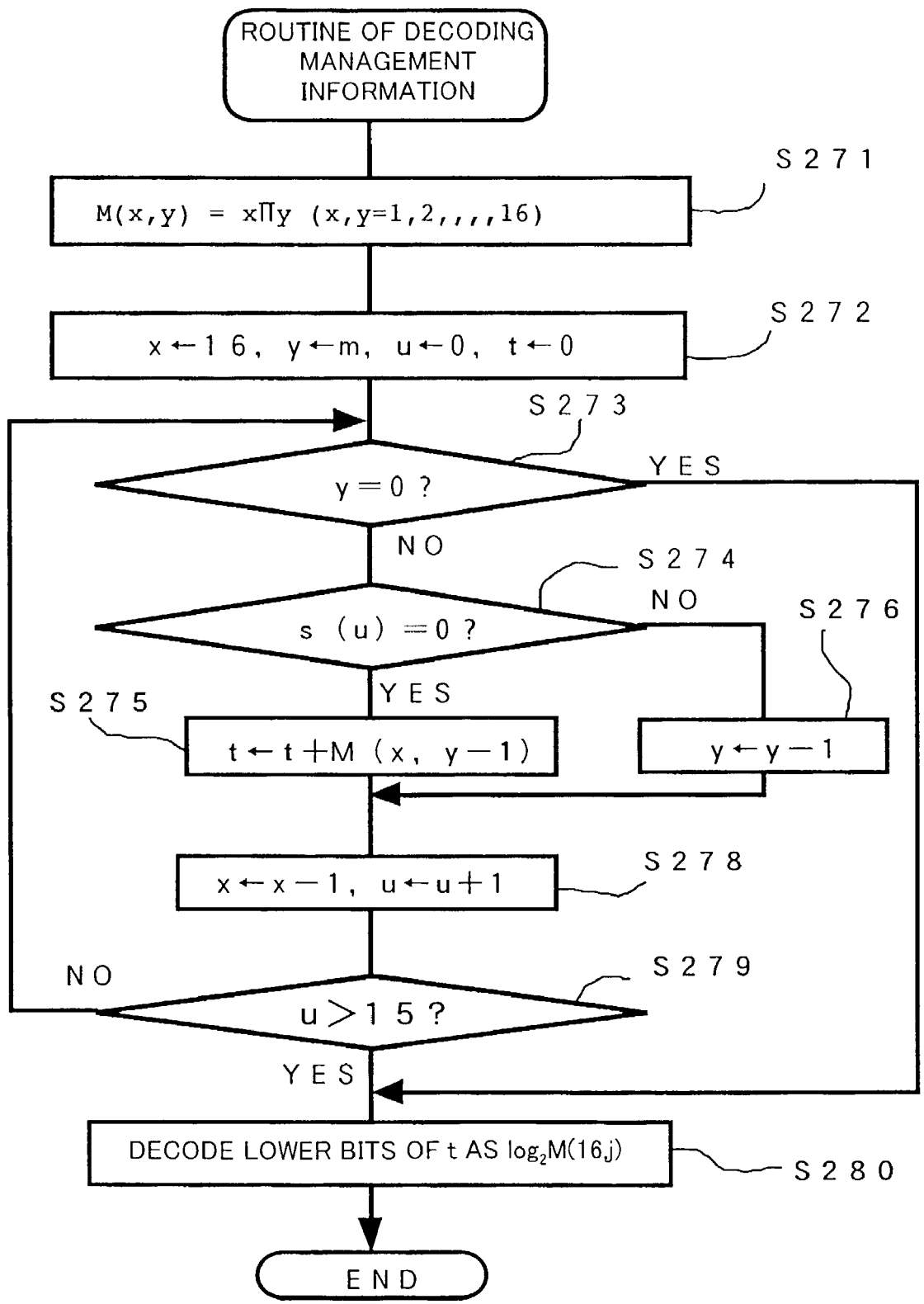
FIG. 12 is a flowchart showing a routine of decoding copyright management information.

The above series of processing enables the bit information s(u) embedded in the adjoining two blocks to be extracted easily and stably. When all the pieces of bit information s(u) corresponding to u=0, 1, 2, ..., 15 are identified to specify the basic pattern of the digital watermark, the process decodes the copyright management information. FIG. 12 is a flowchart showing a routine of decoding copyright management information. When the program enters this routine, the CPU first uses variables x and y, which may take values in a range of 1 to 16, and substitutes a number of combinations xIIy of the variables x and y into an array M(x,y) (step S271). The CPU then initializes the values x, y, u, and t (step S272), prior to a series of processing discussed below.

At step S273, it is determined whether or not the variable y, which is initialized to the value m, is equal to 0. This determines conclusion of the retrieval. Immediately after a start of this routine, the value of the variable y is not equal to 0. The program accordingly proceeds to step S274, at which it is determined whether or not the bit information s(u) is equal to 0. When the bit information s(u) is equal to 0, an array M(x, y−1) is added to the decimal digits corresponding to the copyright management information (step S275). When the bit information s(u) is not equal to 0, on the other hand, the variable y is decremented by one (step S276). In either case, the variable x is decremented by one while the variable u is incremented by one (step S278).

The CPU subsequently determines whether or not the variable u exceeds the value '15' (step S279). When the variable u exceeds 15 or when the variable y is equal to 0, the program shifts to step S280 to decode the lower bits of the management information t as $\log_2$ M(16,j). The above series of processing decodes the numerical data, that is, the copyright management information t, embedded in the basic pattern of the digital watermark. The technique of this embodiment specifies the basic pattern and repeats the basic pattern a plurality of times to embed the digital watermark. This dual structure ensures introduction of rich redundancy and enables the digital watermark to be decoded easily and stably.

Figure 13:
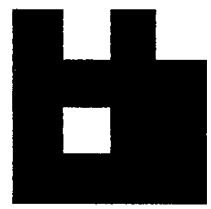
FIG. 13 illustrates a basic pattern used in an experiment.
Figure 14:
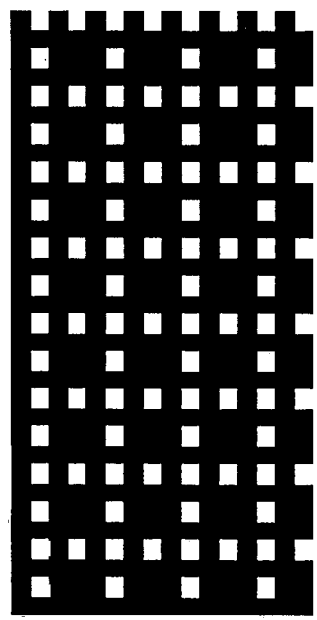
FIG. 14 illustrates a watermark pattern obtained by iteratively laying out the basic pattern in the experiment.
Figure 17:
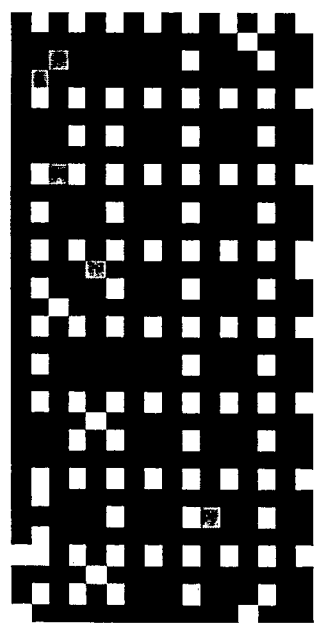
FIG. 17 illustrates the watermark pattern decoded from the image data exposed to the Laplacian attack.
Figure 15:
FIG. 15 shows an image with the watermark pattern embedded therein in the experiment.
Figure 16:
FIG. 16 shows image data after a Laplacian attack.

An experiment was made to embed the copyright management information according to the procedure of the embodiment discussed above. In this experiment, t=123 (decimal digits) was used as the copyright management information T. The value m=3 was adopted to express the value t by taking into account the result shown in FIG. 5. FIG. 13 shows the basic pattern generated by the method of the embodiment. The generated basic pattern was laid out iteratively in the area of 256×256 at the ratio of one to every two blocks as shown in FIG. 3. This gave a watermark pattern shown in FIG. 14. This binary image was embedded as the watermark information in the DCT frequency coefficient domain with regard to a variable-density image P. The embedded result is shown in FIG. 15. FIG. 16 shows the result of a Laplacian attack against the resulting image P' with the watermark information embedded therein. The watermark information was decoded from the image exposed to the Laplacian attack. The decoded result is shown in FIG. 17. As clearly understood from the illustration, the original watermark pattern is mostly preserved through the Laplacian attack. Although part of the watermark pattern was lost, it was easy to accurately restore the original basic pattern from this attacked iterative pattern by utilizing, for example, the principle of majority rule.

The embodiment of the present invention and the results of the experiment are described above. The computer programs that attain the functions of the block extraction unit 31, the transformation unit 32, the bit information embedding unit 33, and the output unit 34 are provided in a specific form recorded in a computer readable recording medium, such as flexible disks or CD-ROMs. The computer reads the computer programs from the recording medium and transfers the computer programs to either an internal storage device or an external storage device. Alternatively the computer programs may be supplied to the computer via the communication path. A microprocessor included in the computer executes the computer programs stored in the internal storage device to attain the functions specified by the computer programs. In accordance with an alternative procedure, the computer reads the computer programs recorded in the recording medium and directly executes the computer programs.

In the specification hereof, the term 'computer' expresses the concept including a hardware device and an operating system and thus represents the hardware device working under the control of the operating system. In the case where the operating system is not required but application software alone can activate the hardware device, the hardware device itself is equivalent to the computer. The hardware device includes at least a microprocessor like a CPU and means for reading the computer programs recorded in the recording medium. The computer programs include program codes that cause the computer to attain the functions of the respective units discussed previously. Part of the functions may be attained not by the application software but by the operating system. The programs for carrying out the digital watermark embedding process and the digital watermark decoding process may be added to image processing software in the form of plug-in software programs.

Typical examples of the 'recording medium' adopted in the present invention include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media.

The above embodiment is to be considered in all aspects as illustrative and not restrictive. There may be many modifications, changes, and alterations without departing from the scope or spirit of the main characteristics of the present invention.

INDUSTRIAL APPLICABILITY

The technique of the present invention is applicable for apparatuses of embedding watermark information in electronic data and apparatuses of electronic identification. The technique is effectively applied for embedding copyright information and for cryptography that includes apparatuses and methods of encryption, transmission, and decryption.

What is claimed is:

1. A method of embedding a digital watermark in a master image, said embedding method comprising the steps of:
   extracting blocks of a predetermined size from said master image;
   processing image data corresponding to each block by orthogonal transform;
   comparing orthogonal transformed coefficients between at least two blocks having a predetermined relationship with each other and making the coefficients satisfy a preset order of magnitude according to bit information specified as the digital watermark;
   quantizing the coefficients obtained by the orthogonal transform with a quantization table and using the quantized coefficients to embed the bit information, wherein embedding the bit information is carried out when, are not all equal to zero; and
   processing each block with the embedded bit information by inverse orthogonal transform, so as to output a resulting image with the digital watermark embedded therein;
   introducing a logic function that is true when a difference between the orthogonal transformed coefficients of the at least two blocks having the predetermined relationship is in a preset range; and
   modifying a procedure adopted to embed the bit information, based on the true and false state of the logic function.

2. An embedding method in accordance with claim 1, wherein the orthogonal transform is discrete cosine transform.

3. An embedding method in accordance with claim 1, said method further comprising the steps of:
   converting the image data into a system of a luminance Y and color differences Cb and Cr, prior to the orthogonal transform, and carrying out discrete cosine transform of the luminance Y and the color differences Cb and Cr as the orthogonal transform; and
   embedding the bit information in coefficients obtained by the discrete cosine transform of the luminance Y.

4. An embedding method in accordance with claim 1, said method further comprising the steps of:
   providing a secret key corresponding to each coefficient; and
   modifying the procedure adopted to embed the bit information, based on the secret key corresponding to each coefficient and the true and false state of the logic function with regard to the coefficient.

5. An embedding method in accordance with claim 1, said method further comprising the steps of:
   providing a basic pattern, which is defined in a two-dimensional manner as a combination of binary information, as information of the digital watermark;
   specifying each piece of binary information included in the provided basic pattern as the bit information to be embedded; and
   embedding the binary information of the basic pattern by setting the at least two blocks having the predetermined relationship to one unit.

6. An embedding method in accordance with claim 5, said method further comprising the step of:
   embedding the basic pattern in the image data iteratively a predetermined number of times, when the number of elements constituting the basic pattern is greater than the number of extracted blocks.

7. An embedding method in accordance with claim 5, wherein the basic pattern has redundancy.

8. An embedding method in accordance with claim 7, wherein the basic pattern having redundancy is a density pattern.

9. A method of decoding a digital watermark from a master image with the digital watermark embedded therein via the method of claim 1, said decoding method comprising the steps of:
   extracting blocks of a predetermined size from said master image;
   processing image data corresponding to each block by orthogonal transform; and
   comparing orthogonal transformed coefficients between at least two blocks having a predetermined relationship with each other and extracting bit information, based on a preset order of magnitude that is applied to the coefficients.

10. A decoding method in accordance with claim 9, wherein the predetermined relationship between the at least two blocks is an arrangement of contiguity.

11. A decoding method in accordance with claim 9, said method further comprising the steps of:
converting the image data into a system of a luminance Y and color differences Cb and Cr, prior to the orthogonal transform, and carrying out discrete cosine transform of the luminance Y and the color differences Cb and Cr as the orthogonal transform; and
extracting the bit information, based on coefficients obtained by the discrete cosine transform of the luminance Y.

12. A decoding method in accordance with claim 9, said method further comprising the steps of:
arranging the extracted bit information and finding a repetitive pattern in the arranged bit information to restore the repetitive pattern as a basic pattern; and
decoding the digital watermark from the basic pattern.

13. An apparatus for embedding a digital watermark in a master image, said digital watermark embedding apparatus comprising:
block extraction means that extracts blocks of a predetermined size from said master image;
transformation means that processes image data corresponding to each block by orthogonal transform; and
bit information embedding means that compares orthogonal transformed coefficients between at least two blocks having a predetermined relationship with each other and makes the coefficients satisfy a preset order of magnitude according to bit information specified as the digital watermark;
coefficient quantizing means that quantize the coefficients obtained by the orthogonal transform with a quantization table and use the quantized coefficients to embed the bit information, wherein embedding the bit information is carried out when the quantized coefficients of the at least two blocks are not all equal to zero;
output means that processes each block with the embedded bit information by inverse orthogonal transform, so as to output a resulting image with the digital watermark embedded therein;
logic function introduction means that introduces a logic function that is true when a difference between the orthogonal transformed coefficients of the at least two blocks having the predetermined relationship is in a preset range; and
procedure modification means that modifies a procedure adopted to embed the bit information, based on the true and false state of the logic function.

14. An apparatus for decoding a digital watermark from a master image with the digital watermark embedded therein by the apparatus of claim 13, said digital watermark decoding apparatus comprising:
block extraction means that extracts blocks of a predetermined size from said master image;
transformation means that processes image data corresponding to each block by orthogonal transform; and
bit information extraction means that compares orthogonal transformed coefficients between at least two blocks having a predetermined relationship with each other and extracts bit information, based on a preset order of magnitude that is applied to the coefficients.

15. A computer storage device in which a program for embedding a digital watermark in a master image is recorded in a computer readable manner, said program causing a computer to attain the functions of:
extracting blocks of a predetermined size from said master image;
processing image data corresponding to each block by orthogonal transform;
comparing orthogonal transformed coefficients between at least two blocks having a predetermined relationship with each other and making the coefficients satisfy a preset order of magnitude according to bit information specified as the digital watermark;
quantizing the coefficients obtained by the orthogonal transform with a quantization table and using the quantized coefficients to embed the bit information, wherein embedding the bit information is carried out when the quantized coefficients of the at least two blocks are not all equal to zero;
processing each block with the embedded bit information by inverse orthogonal transform, so as to output a resulting image with the digital watermark embedded therein
introducing a logic function that is true when a difference between the orthogonal transformed coefficients of the at least two blocks having the predetermined relationship is in a preset range; and
modifying a procedure adopted to embed the bit information, based on the true and false state of the logic function.

16. A computer storage device in which a program for decoding a digital watermark from a master image with the digital watermark embedded therein via the method recorded in the recording medium of claim 15 is recorded in a computer readable manner, said program causing a computer to attain the functions of:
extracting blocks of a predetermined size from said master image;
processing image data corresponding to each block by orthogonal transform; and
comparing orthogonal transformed coefficients between at least two blocks having a predetermined relationship with each other and extracting bit information, based on a preset order of magnitude that is applied to the coefficients.

* * * * *